United States Patent
Hisamatsu (10) Patent No.: US 8,171,327 B2
(45) Date of Patent: May 1, 2012

(54) PACKET PROCESSING DEVICE, POWER-SAVING DEVICE, AND POWER SUPPLY METHOD

(75) Inventor: Hidenori Hisamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 12/397,958

(22) Filed: Mar. 4, 2009

(65) Prior Publication Data

US 2009/0235101 A1   Sep. 17, 2009

(30) Foreign Application Priority Data

Mar. 13, 2008   (JP) ................. 2008-064401

(51) Int. Cl.
*G06F 1/32*   (2006.01)
(52) U.S. Cl. ...................... 713/330; 713/324
(58) Field of Classification Search .................. 713/323
See application file for complete search history.

(56) References Cited

U.S. PATENT DOCUMENTS

| 6,647,502 | B1 * | 11/2003 | Ohmori ................. 713/322 |
| 2002/0169990 | A1 | 11/2002 | Sherburne, Jr. |
| 2005/0210305 | A1 | 9/2005 | Kihara |
| 2006/0206737 | A1 | 9/2006 | Lee |

FOREIGN PATENT DOCUMENTS

| JP | 2002182807 A | 6/2002 |
| JP | 2003158771 A | 5/2003 |

* cited by examiner

*Primary Examiner* — Ryan Stiglic (57) ABSTRACT

In a packet processing device capable of reducing power consumption when time intervals between input packets is increased and an input traffic capacity is reduced, packet processors, N in number (N is an integer of one or more), sequentially perform processing in response to an input packet to output a processed packet and processor packet detectors detect whether or not a packet exists in the packet processors. Responsive to a result of the processor packet detectors, a power supply switch unit controls power supply to the packet processors. Thus, each of the packet processors is intermittently put into an active state by intermittent power supply.

20 Claims, 6 Drawing Sheets

| PACKET NON-DETECTION SIGNAL STRING (G, A, B, C) | FIRST POWER SUPPLY GATE CONTROL SIGNAL D | SECOND POWER SUPPLY GATE CONTROL SIGNAL E | THIRD POWER SUPPLY GATE CONTROL SIGNAL F |
|---|---|---|---|
| (1, 1, 1, 1) | CLOSE | CLOSE | CLOSE |
| (0, 1, 1, 1) | OPEN | CLOSE | CLOSE |
| (1, 0, 1, 1) | OPEN | OPEN | CLOSE |
| (1, 1, 0, 1) | CLOSE | OPEN | OPEN |
| (1, 1, 1, 0) | CLOSE | CLOSE | OPEN |
| (0, 0, 1, 1) | OPEN | OPEN | CLOSE |
| (0, 1, 0, 1) | OPEN | OPEN | OPEN |
| (0, 1, 1, 0) | OPEN | CLOSE | OPEN |
| (1, 1, 0, 0) | CLOSE | OPEN | OPEN |
| (1, 0, 0, 1) | OPEN | OPEN | OPEN |
| (1, 0, 1, 0) | OPEN | OPEN | OPEN |
| (1, 0, 0, 0) | OPEN | OPEN | OPEN |
| (0, 1, 0, 0) | OPEN | OPEN | OPEN |
| (0, 0, 1, 0) | OPEN | OPEN | OPEN |
| (0, 0, 0, 1) | OPEN | OPEN | OPEN |
| (0, 0, 0, 0) | OPEN | OPEN | OPEN |

| PACKET NON-DETECTION SIGNAL STRING (G, A, B, C) | FIRST POWER SUPPLY GATE CONTROL SIGNAL D | SECOND POWER SUPPLY GATE CONTROL SIGNAL E | THIRD POWER SUPPLY GATE CONTROL SIGNAL F |
|---|---|---|---|
| (1, 1, 1, 1) | CLOSE | CLOSE | CLOSE |
| (0, 1, 1, 1) | CLOSE | CLOSE | CLOSE |
| (1, 0, 1, 1) | OPEN | CLOSE | CLOSE |
| (1, 1, 0, 1) | CLOSE | OPEN | CLOSE |
| (1, 1, 1, 0) | CLOSE | CLOSE | OPEN |
| (0, 0, 1, 1) | OPEN | CLOSE | CLOSE |
| (0, 1, 0, 1) | CLOSE | OPEN | CLOSE |
| (0, 1, 1, 0) | CLOSE | CLOSE | OPEN |
| (1, 1, 0, 0) | CLOSE | OPEN | OPEN |
| (1, 0, 0, 1) | OPEN | OPEN | CLOSE |
| (1, 0, 1, 0) | OPEN | CLOSE | OPEN |
| (1, 0, 0, 0) | OPEN | CLOSE | OPEN |
| (0, 1, 0, 0) | CLOSE | OPEN | OPEN |
| (0, 0, 1, 0) | OPEN | CLOSE | OPEN |
| (0, 0, 0, 1) | OPEN | OPEN | CLOSE |
| (0, 0, 0, 0) | OPEN | OPEN | OPEN |

PACKET PROCESSING DEVICE, POWER-SAVING DEVICE, AND POWER SUPPLY METHOD

This application is based upon and claims the benefit of priority from Japanese Patent Application No. 2008-064401, filed Mar. 13, 2008, the disclosure of which is incorporated herein in its entirety by reference.

FIELD OF THE INVENTION

The present invention relates to a packet processing device, a power-saving device, and a power supply method.

BACKGROUND OF THE INVENTION

Various energy saving measures are being studied and developed at the global level for the purpose of global environment protection. In this trend, many countries have begun to discuss about enactment of legislation to mandate energy saving and reduction of carbon-dioxide emissions.

In general, many people will think that such energy saving measures apply to energy consumption arising from fields of transportation, logistics, and manufacture. On the other hand, also attracting attention is the increase in energy consumption by electronic equipment such as computers and servers, and information communication equipment and network infrastructure.

In the case of electronic equipment such as computers and servers, the equipment is often kept in the so-called stand-by state for a relatively long period of time. This shows that a relatively long period of time is spent without arithmetic processing. Therefore, reduction of the power consumption during the stand-by state effectively helps reducing the average power consumption, and hence reducing the carbon-dioxide emissions.

As for information communication equipment, however, such equipment should be always kept in the data communicable state even though the communication system has been changed from analog to digital. Therefore, unlike the electronic equipment such as computers and servers, the information communication equipment can not pre-requisitely dispense with the stand-by state. In other words, the average power consumption cannot be reduced in the information communication equipment unless the stationary or ordinary operating power is reduced.

As a result, the effort of power reduction is mainly pursued from the viewpoint of device technologies aiming at reduction of the operating voltage accompanied by the increased degree of integration and miniaturization of electronic components.

However, the operating voltage of such electronic components has already been reduced to less than one volt. Accordingly, in an actual trend, a reduction rate of operating voltage due to miniaturization of electronic components now becomes slow, and so the effect obtained by increased degree of integration tends to become slow down.

This has made it difficult to achieve significant reduction of power consumption, only by miniaturization or increased degree of integration of electronic components.

Advanced miniaturization of electronic components (for example, below 90 nm) has increased the leaked current up to a non-negligible level. For this reason, the power consumption during the stand-by state is being significantly increased in spite of research efforts made by device vendors using the device technologies.

On the other hand, various researches are being made also from the viewpoint of circuitry designs. Specifically, efforts of reducing the power consumption are slowly but progressively pursued by employing an asynchronous circuit architecture and method using no clocks in place of a clock synchronization circuit architecture and method currently mainly used in designing internal circuit configuration of electronic components.

This technique aims to reduce the average power consumption by reducing the stationary operating power and the power consumption during the stand-by state. However, special development tools are required for design and verification in order to employ such asynchronous circuit architecture and method as a development method of common electronic components such as ASICs and FPGAs, but such tools are not easily accessible yet for developers in general.

A packet processing device related to the present invention will be described with reference to FIG. 6.

Figure 6:
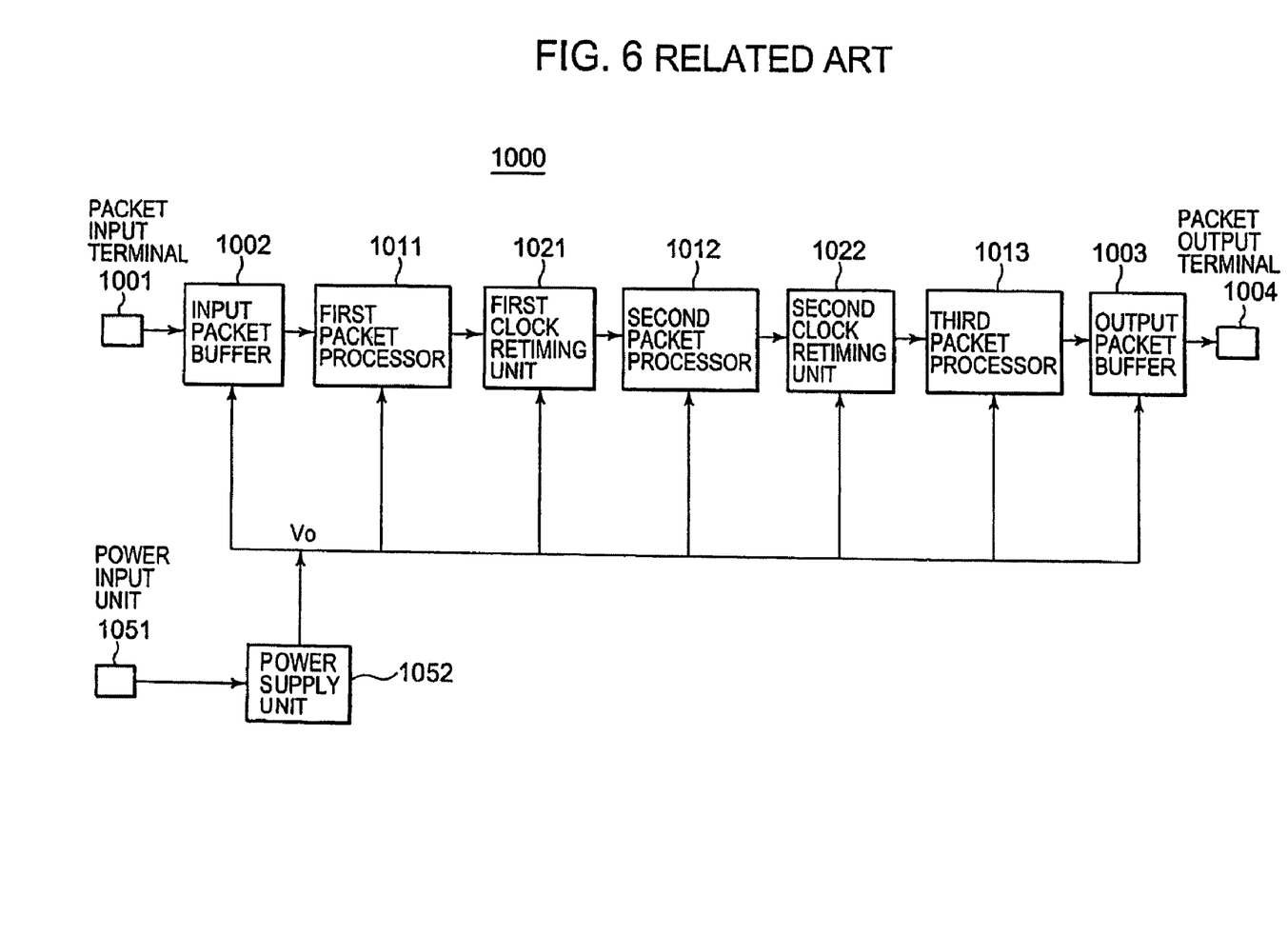
FIG. 6 is a block diagram of a packet processing device related to the present invention.

FIG. 6 is a block diagram showing an example of a packet processing device provided in packet communication equipment which has a variable input traffic capacity.

In a packet processing device 1000 shown in FIG. 6, a packet input to a packet input terminal 1001 is temporarily stored in an input packet buffer 1002 and then transferred to a first packet processor 1011.

The first packet processor 1011 performs first packet processing in response to the packet and then outputs a first processed packet to the following stage.

The first processed packet output from the first packet processor 1011 is transferred to a second packet processor 1012 via a first clock retiming unit 1021.

The second packet processor 1012 performs second packet processing in response to the first processed packet and then outputs a second processed packet to the following stage.

The second processed packet output from the second packet processor 1012 is transferred to a third packet processor 1013 via a second clock retiming unit 1022.

The third packet processor 1013 performs third packet processing in response to the second processed packet and then outputs a third processed packet to the following stage.

The third processed packet output from the third packet processor 1013 is temporarily stored in an output packet buffer 1003 and then supplied as a processed output packet through a packet output terminal 1004 to the outside of the packet processing device 1000.

On the other hand, power supply for the packet processing device 1000 is provided to a power input unit 1051. The power input unit 1051 outputs the input power supply to a power supply unit 1052.

The power supply unit 1052 delivers electric power to the respective devices and units of the packet processing system 1000 at currents and voltages suitable for use in the devices and units.

Japanese Laid-Open Patent Publication No. 2003-158771 (Patent Document 1) and Japanese Laid-Open Patent Publication No. 2002-182807 (Patent Document 2) are known as prior art documents related to the present invention.

In Patent Document 1, the following three functions are set forth as its basic features in claim 1.

1) First reception means for constantly monitoring reception of a notification signal notifying arrival of a packet and reception of a packet, and for receiving the notification signal or the packet;

2) Second reception means for receiving a packet with a greater reception power than the first reception means; and 3) A reception controller operable in a state of receiving no packet so as to cause the first reception means to monitor reception of a notification signal or packet. When the first reception means receives a notification signal or packet, the reception controller switches from the first reception means to the second reception means.

According to the technique described in Patent Document 1, the power consumption can be reduced by constantly monitoring reception of a packet or a notification signal notifying arrival of a packet and by switching between two reception means, namely first and second reception means.

Patent Document 2 discloses a condition detector and a power table which has a plurality of power control registers. The condition detector rewritably stores a plurality of operating conditions (for example, a comparison address given to a program counter) and judges whether a current condition of a processor is matched with either one of the operating conditions. Either one of the power control registers is selected by an index signal which is produced in response to a result of the judgment. The power control information selected by the index signal is delivered to a voltage and clock controller to control power consumption of an object circuit block.

According to Patent Document 2, since the power control information in the power table and the various processor operating conditions are rewritable, the user is allowed to define the low-power-consumption operation of the processor in detailed manner. Further, the provision of the condition detector makes it possible to provide an event-driven-type power control device capable of relieving the burden in programming.

SUMMARY OF THE INVENTION

In the packet processing device 1000 having configuration as shown in FIG. 6, the first to third packet processors 1011 to 1013 are constantly supplied with power from the power supply unit 1052.

This means that, even if the intervals of input packets become long and the input traffic capacity is thus reduced, the first to third packet processors 1011 to 1013 are always supplied with power from the power supply unit 1052 in spite of the fact that no packet processing operation is performed due to no existence of any packet in each of the first to third packet processors 1011 to 1013.

Therefore, power is constantly wasted, for example, in a driver for transferring clock, clock wiring patterns depending on a clock wiring capacity, clock-operating flip-flops, and clock-dependent units in the clock-synchronous memory. In other words, so-called stand-by power consumption occurs. As a result, the average operating power consumption is not reduced significantly even during low traffic operation.

According to the technology described in Patent Document 1, the reduction of power consumption is achieved by constantly monitoring reception of a packet or a notification signal notifying arrival of a packet and switching between two reception means, such as the first and second reception means. Accordingly, the technology of Patent Document 1 is significantly different from the present invention in configuration for achieving reduction of power consumption.

According to the technology described in Patent Document 2, it is necessary to provide a power table having a plurality of power control registers for determining an operating condition of the processor (for example, a condition that the comparison addresses for the program counter match), and for rewritably storing power control information. Therefore, this technology is also significantly different from the present invention in configuration for achieving reduction of power consumption.

The present invention seeks to solve at least one the problems as described above. Specifically, the present invention seeks to provide a packet processing device, a power-saving device and a power supply method capable of reducing the power consumption, with a simple configuration, when intervals of input packets become long and thus the input traffic capacity is reduced.

According to a first aspect of the present invention, there is obtained a packet processing device comprising packet processors, N in number (N is an integer of one or more), which sequentially perform processing in response to an input packet to output a processed packet, processor packet detectors which detect whether or not a packet exists in the respective packet processors, and a power supply switch unit for switching on and off the power supply to the packet processors according to a result of detection by the processor packet detectors.

According to a second aspect of the present invention, there is obtained a power-saving device to be provided in a packet processing system having packet processors, N in number (N is an integer of one or more), which sequentially perform processing in response to an input packet to output a processed packet, the power-saving device comprising processor packet detectors which detect whether or not a packet exists in the respective packet processors, and a power supply switch unit which switches on and off the power supply to the packet processors according to a result of detection of the processor packet detectors.

According to a third aspect of the present invention, there is obtained a power supply method for supplying power to packet processors, N in number (N is an integer of one or more) which sequentially process an input packet to output a processed packet, the method comprising detecting whether or not a packet exists in the packet processors and switching on and off the power supply to the packet processors in accordance with a detection result in the above-mentioned detecting.

According to the present invention, when the time intervals of input packets become long and the input traffic capacity is reduced in the packet processing device, the power consumption of the packet processing device can be reduced with simple configuration.

DESCRIPTION OF THE EXEMPLARY EMBODIMENTS

Exemplary preferred embodiments of the present invention will be described with reference to the drawings.

First Embodiment

Figure 1:
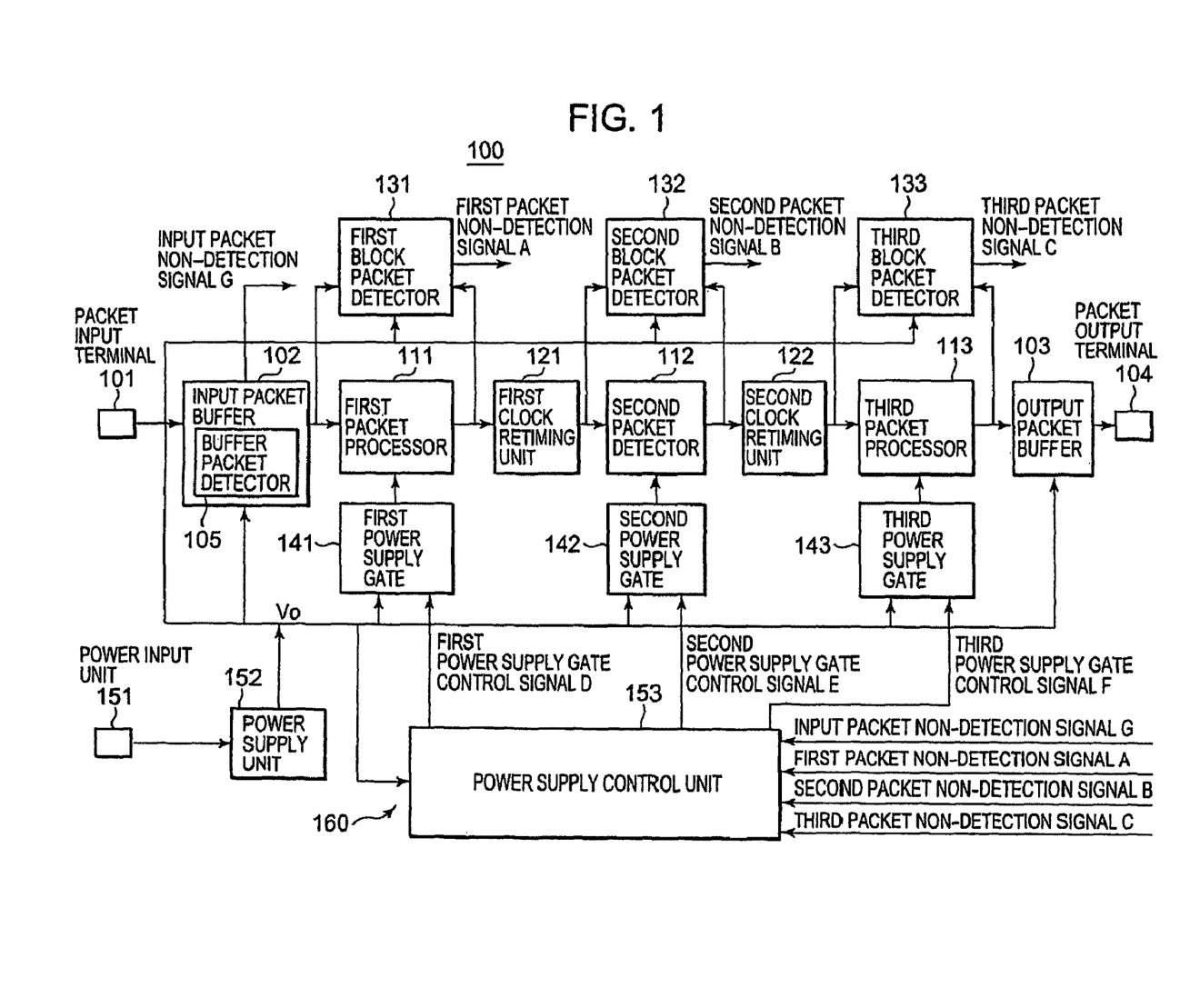
FIG. 1 is a block diagram showing a configuration of a packet processing device according to a first embodiment of the invention.

FIG. 1 is a block diagram showing a configuration of a packet processing device 100 according to a first embodiment of the invention.

As shown in FIG. 1, the packet processing system 100 according to the first embodiment of the present invention includes a packet input terminal 101, an input packet buffer 102, an output packet buffer 103, a packet output terminal 104, a first packet processor 111, a second packet processor (packet processor) 112, a third packet processor 113, a first clock retiming unit 121, a second clock retiming unit 122, a first block packet detector (processor packet detector) 131, a second block packet detector (processor packet detector) 132, a third block packet detector (processor packet detector) 133, a first power supply gate (power supply switch circuit) 141, a second power supply gate (power supply switch circuit) 142, a third power supply gate (power supply switch circuit) 143, a power input unit 151, a power supply unit 152, and a power supply control unit 153.

As shown in FIG. 1, the packet processors 111 to 113 are mutually connected in series (in cascade) with the first and second clock retiming units 121 and 122 interposed between the first and the second packet processors 111 and 112 and between the second and the third packet processors 112 and 113, respectively. At any rate, the first through the third processors 111 to 113 sequentially perform packet processing.

A packet is input to the packet input terminal 101.

The input packet buffer 102 temporarily stores the packet input from the packet input terminal 101 and then outputs the packet to the first packet processor 111.

The input packet buffer 102 has a buffer packet detector 105, which detects whether or not a packet is present in the input packet buffer 102 and outputs an input packet non-detection signal (detection signal) G indicative of a result of the detection.

The first packet processor 111 performs first packet processing in response to the packet input from the input packet buffer 102 and outputs a first processed packet after the first packet processing to the following stage.

The first block packet detector 131 detects whether or not a packet is present in the first packet processor 111, and outputs a first packet non-detection signal (detection signal) A indicative of a result of the detection.

The first processed packet output from the first packet processor 111 is input to the second packet processor 112 via the first clock retiming unit 121.

The second packet processor 112 performs second packet processing in response to the first processed packet input from the first clock retiming unit 121 and outputs a second processed packet after the second packet processing is performed.

The second block packet detector 132 detects whether or not a packet is present in the second packet processor 112 and outputs a second packet non-detection signal (detection signal) B indicative of a result of the detection.

The second processed packet output from the second packet processor 112 is input to the third packet processor 113 via the second clock retiming unit 122.

The third packet processor 113 performs third packet processing on the second processed packet input from the second clock retiming unit 122 and outputs a third processed packet after the third packet processing is performed.

The third block packet detector 133 detects whether or not a packet is present in the third packet processor 113 and outputs a third packet non-detection signal (detection signal) C indicating a result of the detection.

The first to third packet processing performed by the packet processors 111 to 113 may be any packet processing. For example, the first to third packet processing may be processing of routing or switching an IP packet or the like.

The output packet buffer 103 temporarily stores the packet output from the third packet processor 113 and then outputs the packet to an external circuit (not shown) outside through the packet output terminal 104.

Power supply for the packet processing system 100 is made to the power input unit 151 as input power supply. The input power supply may be either AC power supply or DC power supply.

The power input unit 151 output the input power supply to the power supply unit 152.

The power supply unit 152 generates, from the power supply input from the power input unit 151, electric power specified by current and voltage suitable for use in the units in the packet processing system 100 and supplied the generated power to the respective units.

The power supply unit 152 supplies electrical power to the first packet processor 111 via the first power supply gate 141.

Likewise, the power supply unit 152 supplies electrical power to the second packet processor 112 via the second power supply gate 142.

Similarly, the power supply unit 152 supplies electrical power to the third packet processor 113 via the third power supply gate 143.

It is assumed here, for ease of explanation, that the illustrated electrical power supply is represented by a single voltage V0 (see FIG. 1) and is supplied in common to the various units.

The illustrated power supply control unit 153 supplies a first power supply gate control signal D to the first power supply gate 141. The first power supply gate 141 performs either an operation of supplying the electrical power (V0) supplied from the power supply unit 152 to the first packet processor 111 (to open the gate), or an operation of not supplying the electrical power thereto (to close the gate).

Likewise, in accordance with a second power supply gate control signal E input from the power supply control unit 153, the second power supply gate 142 performs either an operation of supplying the electrical power supplied from the power supply unit 152 to the second packet processor 112 (to open the gate), or an operation of not supplying the electrical power thereto (to close the gate).

Similarly, in accordance with a third power supply gate control signal F input from the power supply control unit 153, the third power supply gate 143 performs either an operation of supplying the electrical power supplied from the power supply unit 152 to the third packet processor 113 (to open the gate), or an operation of not supplying the electrical power thereto (to close the gate).

The power supply control unit 153 generates and outputs the first to third power supply gate control signals D, E, and F in response to the values of the input packet non-detection signal G, the first packet non-detection signal A, the second packet non-detection signal B, and the third packet non-detection signal C.

In the configuration described above, a power supply switch unit is formed by the power supply control unit 153, the first power supply gate 141, the second power supply gate 142, and the third power supply gate 143. Each of the first through the third power supply gates 141 to 143 is structured by a switch which is turned on or off in response to each of the first through the third power supply gate control signals D, E, and F.

The power supply control unit 153, the first power supply gate 141, the second power supply gate 142, and the third power supply gate 143 cooperate with one another so as to switch on and off the power supply to the packet processors 111 to 113 according to results of detection by the buffer packet detector 105 and the packet detectors 131 and 133 for detecting a packet in the block.

In the configuration as described above, the buffer packet detector 105, the first to third block packet detectors 131 to 133, the power supply control unit 153, and the first to third power supply gates 141 to 143 serve to save power in a manner to be described later and may be collectively called a power-saving device 160 according to the first embodiment.

The packet processing system 100 as described above may be formed for example by a single LSI (Large Scale Integration).

Figure 3:
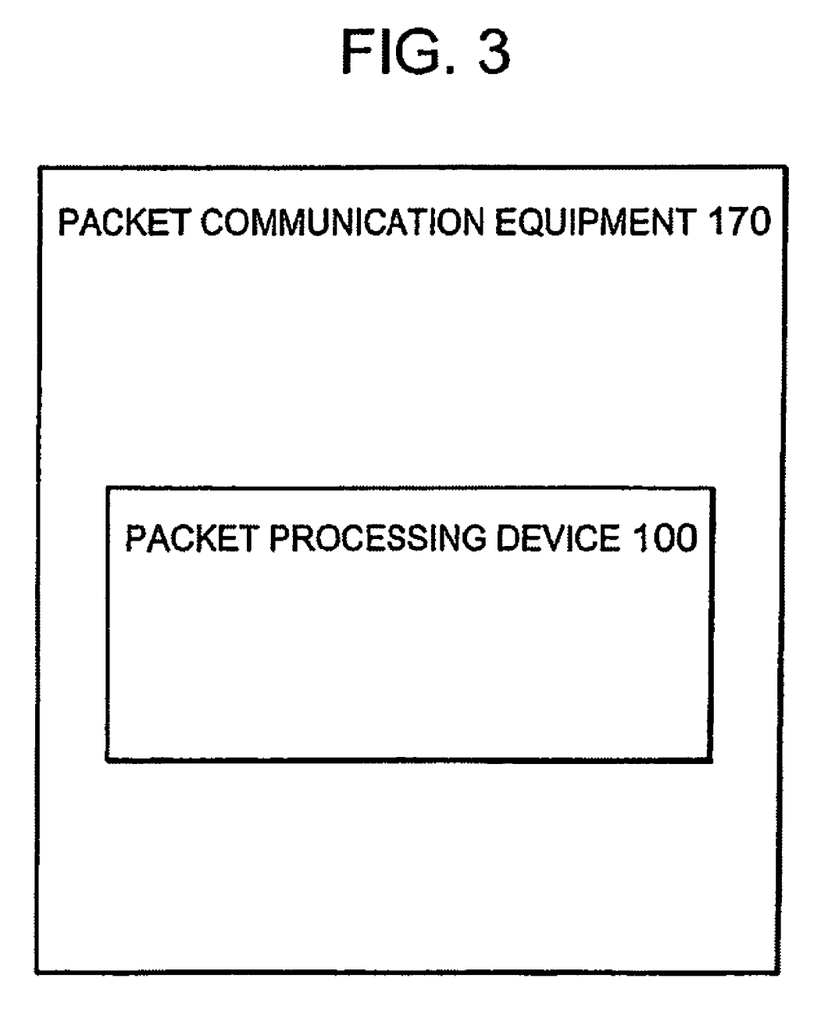
FIG. 3 is a block diagram showing packet communication equipment according to an embodiment of the invention.

The packet processing system 100 as described above may be provided, for example, in packet communication equipment 170 for performing packet communication, as shown in FIG. 3. In this case, this packet communication equipment 170 is designed to receive a packet through wired connection for example, but may be designed to receive a packet through wireless connection.

Among the components in the configuration described above, the first clock retiming unit 121, the second clock retiming unit 122, and the output packet buffer 103 shown in FIG. 1 are well known to those skilled in the art and are not directly related to the present embodiment. Therefore, detailed description thereof will be omitted here.

Next, description will be made on operation of the packet processing system.

When a packet is input to the packet input terminal 101, the packet is temporarily stored in the input packet buffer 102 and then transferred to the first packet processor 111.

The buffer packet detector 105 monitors the number of packets input to the input packet buffer 102 (the number of input packets) and the number of packets output from the input packet buffer 102 (the number of output packets). If the number of packets input from the input packet buffer 102 is the same as the number of packets output from the input packet buffer 102, the buffer packet detector 105 determines that no packet is stored in the input packet buffer 102, and outputs a packet non-detection signal G set to "1" to the power supply control unit 153. The packet non-detection signal G set to "1" indicates that no packet is present in the input packet buffer 102.

If the number of packets input to the input packet buffer 102 is greater than the number of packets output from the input packet buffer 102, then the buffer packet detector 105 determines that packets are stored in the input packet buffer 102, and outputs the packet non-detection signal G set to "0" to the power supply control unit 153. The packet non-detection signal G set to "0" indicates that there exist a packet in the input packet buffer 102.

The first packet processor 111 performs first packet processing in response to the input packet transferred from the input packet buffer 102 and then outputs the first processed packet.

The first block packet detector 131 monitors the number of packets input to the first packet processor 111 and the number of packets output from the first packet processor 111. If the number of packets input to the first packet processor 111 is the same as the number of packets output therefrom, the first block packet detector 131 determines that there exists no packet under processing in the first packet processor 111, and outputs the first packet non-detection signal A set to "1" to the power supply control unit 153. The first packet non-detection signal A set to "1" indicates that no packet is present in the first packet processor 111. Namely, the packet non-detection signal A of "1" is indicative of no existence of any packet in the first packet processor 111. If the number of packets input to the first packet processor 111 is greater than the number of packets output therefrom, the first block packet detector 131 determines that there exists a packet under processing in the first packet processor 111, and outputs a first packet non-detection signal A set to "0" to the power supply control unit 153. The first packet non-detection signal A set to "0" indicates that a packet is present in the first packet processor 111.

The first processed packet output from the first packet processor 111 is transferred to the second packet processor 112 via the first clock retiming unit 121.

The second packet processor 112 performs second packet processing on the packet transferred from the first clock retiming unit 121 and then outputs a second processed packet.

The second block packet detector 132 monitors the number of packets input to the second packet processor 112 and the number of packets output from the second packet processor 112. If the number of packets input to the second packet processor 112 is the same as the number of packets output therefrom, the second block packet detector 132 determines that there exists no packet under processing in the second packet processor 112, and outputs a second packet non-detection signal B set to "1" to the power supply control unit 153. The second packet non-detection signal B of "1" indicates that there exists no packet in the second packet processor 112. In other words, the second packet non-detection signal B of "1" is indicative of no existence of any packet in the second packet processor 112. On the other hand, if the number of packets input to the second packet processor 112 is greater than the number of packets output therefrom, then the second block packet detector 132 determines that there exists a packet under processing in the second packet processor 112, and outputs the second packet non-detection signal B set to "0" to the power supply control unit 153. The second packet non-detection signal B set to "0" indicates that there exists a packet in the second packet processor 112.

The packet output from the second packet processor 112 is transferred to the third packet processor 113 via the second clock retiming unit 122.

The third packet processor 113 performs third packet processing on the packet transferred from the second clock retiming unit 122 and then outputs this packet.

The third block packet detector 133 monitors the number of packets input to third packet processor 113 and the number of packets output from the third packet processor 113. If the number of packets input from the third packet processor 113 is the same as the number of packets output therefrom, the third block packet detector 133 determines that there exists no packet under processing in the third packet processor 113, and outputs a third packet non-detection signal C set to "1" to the power supply control unit 153. Like in the first and the second packet non-detection signals A and B, the third packet non-detection signal C set to "1" indicates that no packet exists in the third packet processor 113. If the number of packets input to the third packet processor 113 is greater than the number of packets therefrom, the third block packet detector 133 determines that there exists a packet under processing in the third packet processor 113, and outputs the third packet non-detection signal C set to "0" to the power supply control unit 153. The packet non-detection signal C set to "0" indicates that a packet exists in the third packet processor 113.

The packet output from the third packet processor 113 is transferred to the output packet buffer 103.

The output packet buffer 103 temporarily stores the packet transferred from the third packet processor 113 and then output the packet to the outside of the packet processing system 100 through the packet output terminal 104.

In this manner, the packet input to the packet processing system 100 is successively processed in the first packet processor 111, the second packet processor 112, and the third packet processor 113 in this sequence, and then output from the packet processing system 100.

The values of the input packet non-detection signal G, the first packet non-detection signal A, the second packet non-detection signal B, and the third packet non-detection signal C vary according to variation in traffic of the packet in the packet processing system 100.

The power supply control unit 153 generates first to third power supply gate control signals D, E, and F in response to the values of the input packet non-detection signal G, the first packet non-detection signal A, the second packet non-detection signal B, and the third packet non-detection signal C and outputs the generated first to third power supply gate control signals D, E, and F to the respective corresponding power supply gates 141 to 143.

Figure 2:
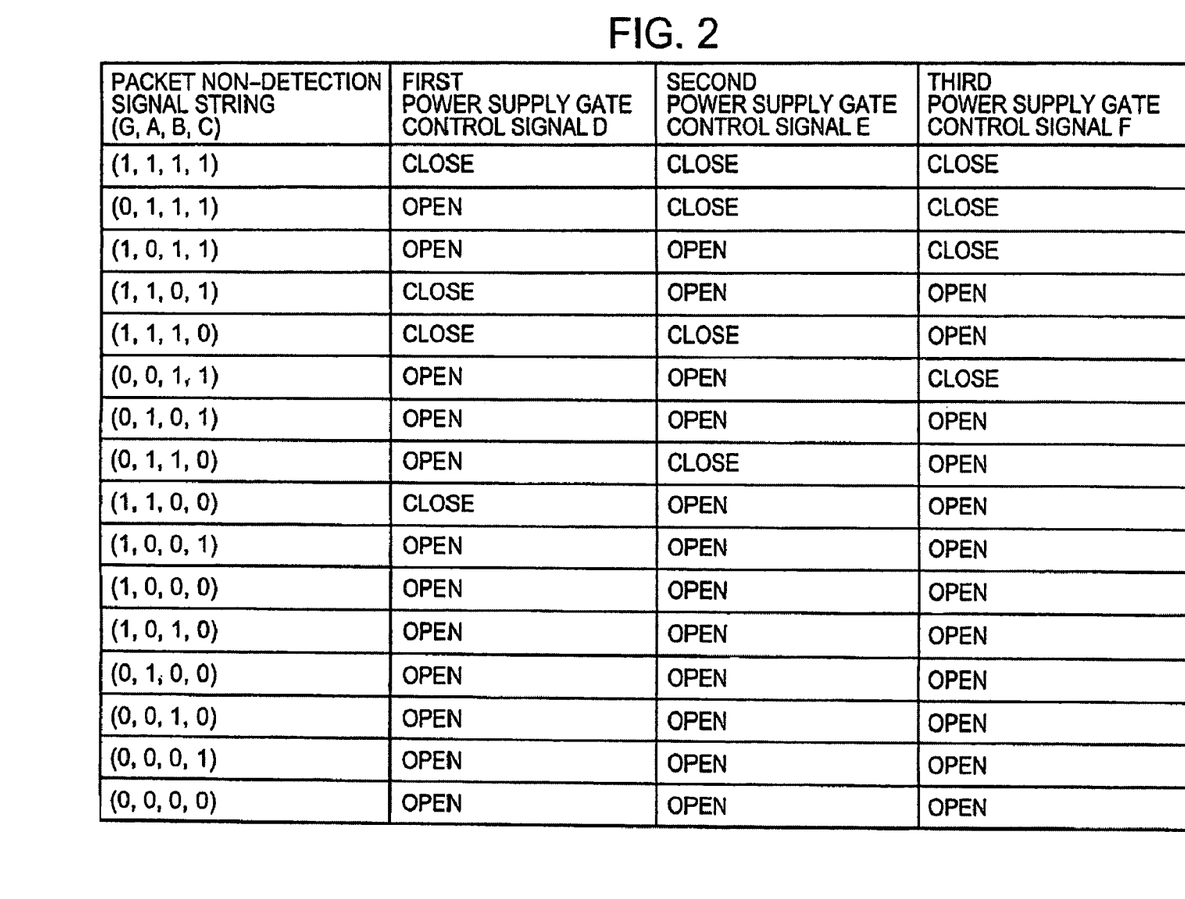
FIG. 2 is a diagram showing power supply gate control signals according to combinations of packet non-detection signals according to the first embodiment.

FIG. 2 is a diagram showing a relationship between signal string of packet non-detection signals G, A, B, and C and indications of the first to third power supply gate control signals D, E, and F.

In FIG. 2, when all of the packet non-detection signals G, A, B, and C are "1", for example, the column of the packet non-detection signal string (G, A, B, C) is filled in as (1,1,1,1), whereas if all the packet non-detection signals G, A, B, and C are "0", the column is filled in as (0,0,0,0).

As shown in FIG. 2, the power supply control unit 153 generates the first to third power supply gate control signals D, E, and F such that power is supplied to a packet processor (packet existent processor) among the packet processors 111 to 113 in which a packet exists, together with a packet processor immediately preceded by or immediately before the packet existent processor in which a packet exists, while no power is supplied to any other packet processors.

Specifically, the power supply control unit 153 generates the first to third power supply gate control signals D, E, and F such that, if a packet exists in any one of the objects (any one of the first to third packet processors 111 to 113) to be supplied with electric power from one of objects to be controlled with the first to third power supply gate control signals D, E, and F (corresponding one of the first to third power supply gates 141 to 143), the one of the gates 141 to 143 to be controlled is opened. In addition, if a packet exists in a circuit immediately preceding the object to be supplied with power from the objects to be controlled with the first to third power supply gate control signals D, E, and F, the power supply control unit 153 also generates the first to third power supply gate control signals D, E, and F so as to open the one of the gates 141 to 143 to be controlled.

In other cases, that is, when no packet exists in power reception objects, such as the first through the third packet processors 111 to 113, to be supplied with power in response to the first to third power supply gate control signals D, E, and F, from a control object, such as the power supply control unit 153 and when no packet exists also in a previous stage of circuits (may be called a previous stage circuit) immediately preceding the power reception objects, the first to third power supply gate control signals D, E, and F are generated such that the gates 141 to 143 to be controlled are closed.

In the illustrated example, the previous stage circuit immediately preceding the first packet processor 111 is the input packet buffer 102, the previous stage circuit immediately preceding the second packet processor 112 is the first packet processor 111, and the previous stage circuit immediately preceding the third packet processor 113 is the second packet processor 112.

Specifically, as shown in FIG. 2, when the packet non-detection signal string is (0,1,1,1), for example, a packet exists in the input packet buffer 102 immediately preceding the first packet processor 111. In this event, the first power supply gate control signal D for turning on and off the power supply to the first packet processor 111 is set to "open" state, as shown in FIG. 2. In this case, however, since no packet presently exists in the packet processors 111 to 113, the second and third power supply gate control signals E and F for turning on and off the power supply to the second and third packet processors 112 and 113 are set to "close" state.

When the packet non-detection signal string is (0,0,1,1), a packet exists in the first packet processor 111. Therefore, the first power supply gate control signal D and the second power supply gate control signal E are set to indicate "open. However, since no packet exists in the second and third packet processors 112 and 113, the third power supply gate control signal F is set to indicate "close".

As for the other packet non-detection signal strings, the first to third power supply gate control signals D, E, and F are as shown in FIG. 2, and detailed description thereof is omitted.

The packet processors 111 to 113 should be supplied with power according to the relationship as shown in FIG. 2 for the following reasons (1) and (2).

(1) No power supply is carried out to packet processors, among the packet processors 111 to 113, which are not performing packet processing.

(2) The packet processors 111 to 113 are not supplied with power on the condition that no packet exists in the circuit immediately preceding the packet processors 111 to 113, either. This is for ensuring sufficient margin time, the time corresponding to the sum of time required for the buffer packet detector 105 and the block packet detectors 131 to 133 to detect a packet (to switch the values of the packet non-detection signals G, A, B, and C), time required for the power supply control unit 153 to compute the power supply gate control signals D, E, and F in accordance with the values of the packet non-detection signals G, A, B, and C, and time required to switch the power supply gates 141 and 143 by means of the power supply gate control signals D, E, and F.

According to the first embodiment as described above, the stoppage of power supply to the packet processors 111 to 113 which need not be supplied with power can be achieved by a such simple construction so as to include the packet detectors 131 to 133 serving for detecting whether or not a packet exists in the packet processors 111 to 113, and the power supply control unit 153 and power supply gates 141 to 143 serving as power supply switch units for switching on and off the power supply to the packet processors 111 to 113 in accordance with a result of detection by the block packet detectors 131 to 133. The reduction of the operating power consumption in the packet processors 111 to 113 reduces the average power consumption of the packet processing device 100, and achieves reduction of power consumption of the packet processing device 100. This is because each of the packet processors 111 to 113 is intermittently supplied with power.

Accordingly, for example in information communication equipment such as packet communication equipment which has a variable input traffic capacity. it can be expected that the average power consumption of the electronic components mounted on the equipment (e.g. FPGAs (Field Programmable Gate Arrays) and ASICs (Application Specific Integrated Circuits)) can be reduced during low traffic input, lower than the maximum traffic capacity, without deteriorating the throughput performance obtained at the maximum input traffic capacity. Thus, a higher effect of reducing the power consumption can be provided, without using any special development tools such as asynchronous circuit configuration or method, in comparison with the conventional clock synchronization circuit configuration and method.

More specifically, power is supplied to a packet existent one of the packet processors 111 to 113 in which a packet exists as well as to a circuit immediately preceding that packet processor, while no power is supplied to the other packet processors. As a result, not only reduction of power consumption is achieved, but also a sufficient margin time is ensured. Specifically, it is possible to ensure the time corresponding to the sum of time required for the buffer packet detector 105 and the block packet detectors 131 to 133 to detect a packet, time required for the power supply control unit 153 to compute the power supply gate control signals D, E, and F in accordance with the values of the packet non-detection signals G, A, B, and C, and time required to switch the power supply gates 141 and 143 by means of the power supply gate control signals D, E, and F.

The input packet buffer 102 is arranged immediately preceding the first packet processor 111 to buffer an input packet and comprises the packet detector 105 for detecting whether or not a packet is present in this input packet buffer 102. In this connection, the power supply control unit 153 supplies power to the first packet processor 111 if the buffer packet detector 105 detects any packet in the input packet buffer 102, whereas if no packet is detected either in the input packet buffer 102 or in the first packet processor 111, the power supply control unit 153 does not supply power to the packet processor 111. Accordingly, reduction in power consumption can be achieved also for the first packet processor 111 in the first stage.

Even though power is supplied also to a packet processor, among the packet processors 111 to 113, immediately preceded by a circuit in which a packet exists, a sufficient margin time sometime cannot be ensured. In other words, it is not possible to ensure the margin time composed of the time corresponding to the sum of time required for the buffer packet detector 105 and the block packet detectors 131 to 133 to detect a packet, time required for the power supply control unit 153 to compute the power supply gate control signals D, E, and F in accordance with the values of the packet non-detection signals G, A, B, and C, and time required to switch the power supply gates 141 and 143 by means of the power supply gate control signals D, E, and F. In such a case, the packet processing device 100 may be designed such that power is supplied to a packet existent processor in which a packet exists, as well as to a packet processor preceded by M (M is an integer of one or more and less than N) relative to the at least one packet existent processor which has any packet, while no power is supplied to the other packet processors.

Second Embodiment

Figure 4:
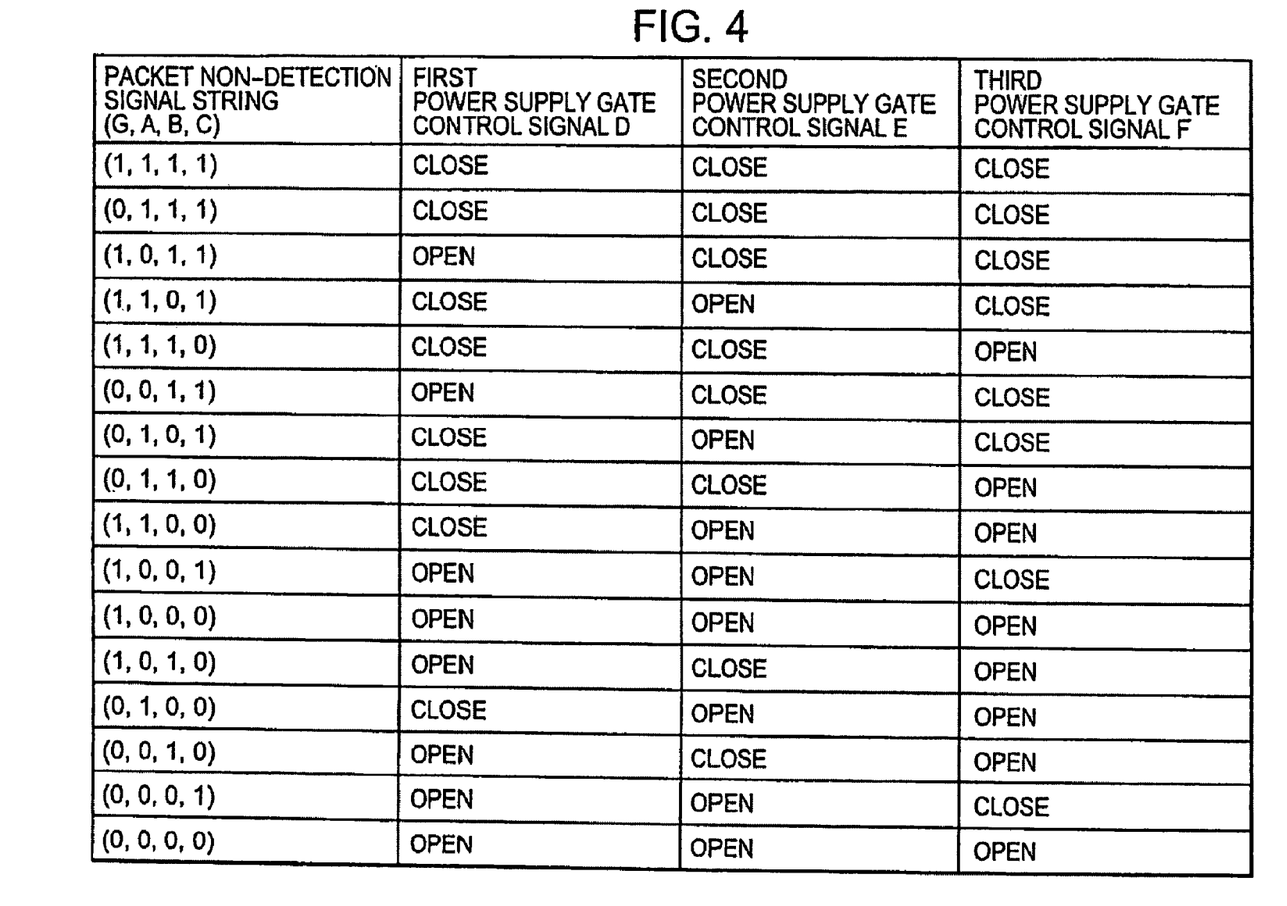
FIG. 4 is a diagram showing power supply gate control signals according combinations of packet non-detection signals according to a second embodiment.

FIG. 4 is a diagram showing relationship between signal string of packet non-detection signals G, A, B, and C and indications of the first to third power supply gate control signals D, E, and F according to the second embodiment.

The description of the first embodiment above has been made in terms of an example in which the power supply gate signals D, E, and F are determined according to the packet non-detection signal strings as shown in FIG. 2.

However, the margin in time need not be considered if it is obvious that the traffic transmission time required for a packet to be transferred from the packet input terminal 101 to the packet output terminal 104 is sufficiently longer than the time corresponding to the sum of time required for the buffer packet detector 105 and the block packet detectors 131 to 133 to detect a packet, time required for the power supply control unit 153 to compute the power supply gate control signals D, E, and F according to the values of the packet non-detection signals G, A, B, and C, and time required to switch the power supply gates 141 to 143 by means of the power supply gate control signals D, E, F.

According to the second embodiment, therefore, the power supply switch unit 153 supplies power only to a packet existent processor, among the packet processors 111 to 113, in which a packet exists, while supplying no power to packet non-existent processors in which no packet exists.

This means that, according to the second embodiment, the power supply control unit 153 determines the power supply gate signals D, E, and F according to the packet non-detection signal strings as shown in FIG. 4.

According to the second embodiment as described above, the power supply switch unit 153 supplies power only to a packet existent processor, among the packet processors 111 to 113, in which a packet exists, while supplying no power to a packet non-existent processor in which no packet exists. Accordingly, minimum necessary power can be supplied to the packet processors 111 to 113, resulting in further reduction of power consumption.

Figure 5:
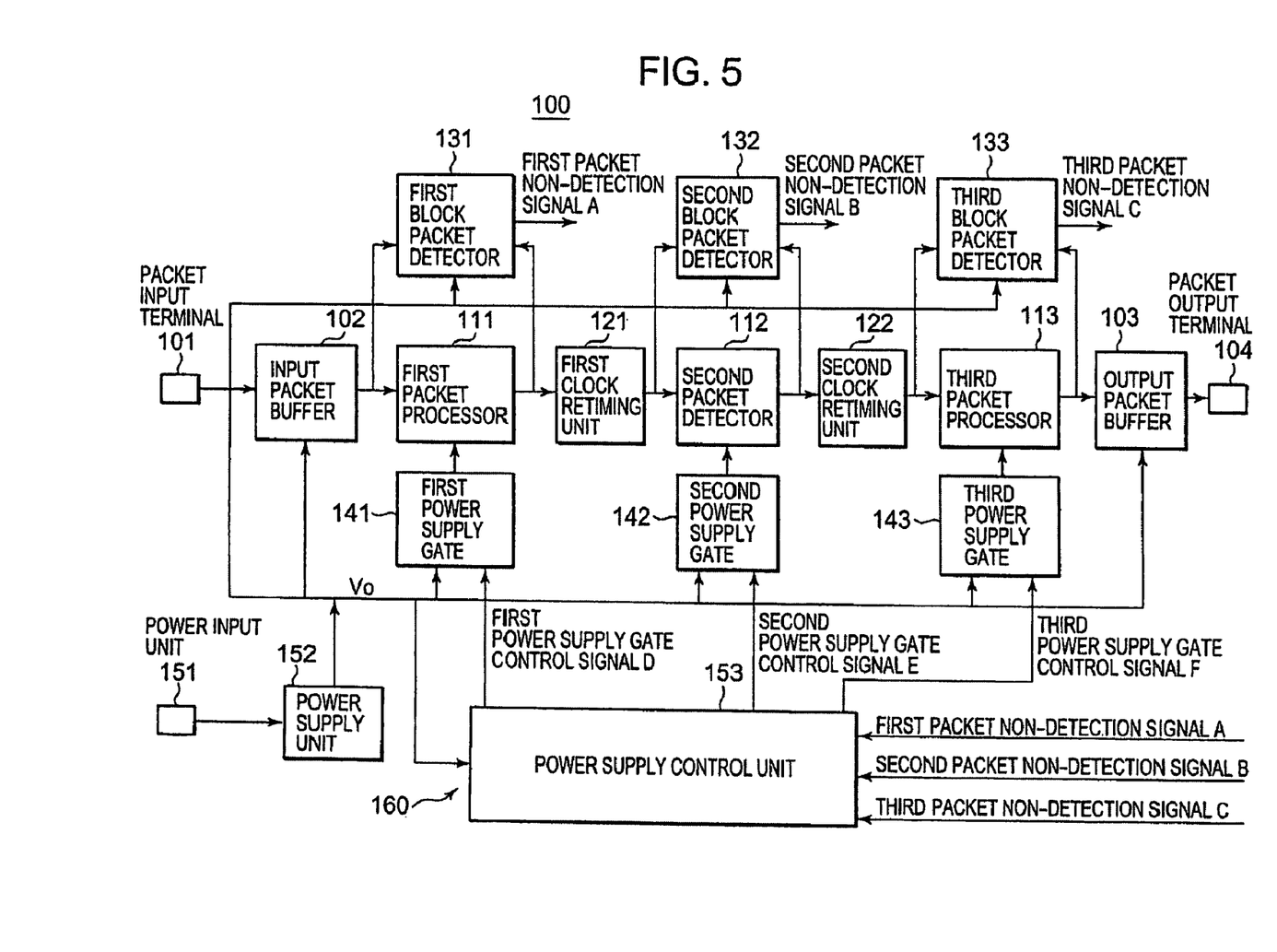
FIG. 5 is a block diagram showing a modification of the packet processing device according to the second embodiment.

Further, according to the second embodiment, the use of the input packet non-detection signal G is not required since the power supply to the packet processors is determined only dependent on whether or not a packet exists in the packet processors. This means that, according to the second embodiment, provision of the buffer packet detector 105 is not required. Therefore, the power supply control unit 153 is allowed to control the power supply to the packet processor in accordance with the packet non-detection signal string (A, B, C). A configuration of the packet processing device 100 in this case is shown in FIG. 5.

Although the description of the embodiments above has been made in terms of an example in which the packet processing device has three packet processors and two clock retiming units, the number of packet processors and the number of clock retiming units are not limited to this example. The packet processing device may be configured to have N (N is an integer) packet processors connected in series and (N−1) clock retiming units, with one clock retiming unit being arranged between two adjacent packet processors. If N is the minimum value of one (N=1), the packet processing device may be formed by a single packet processor and no clock retiming unit is necessary.

Although this invention has been described in conjunction with a few preferred embodiments thereof, this invention is not limited to the foregoing embodiments but may be modified in various other manners within the scope of the appended claims and the following aspects.

Now, this invention would be featured by the following aspects.

According to a first aspect of this invention, there is obtained a packet processing device comprising packet processors, N in number (N is an integer of one or more), which sequentially perform processing in response to an input packet to output a processed packet, processor packet detectors which detect whether or not a packet exists in the respective packet processors, and a power supply switch unit for switching on and off the power supply to the packet processors according to a result of detection by the processor packet detectors.

According to a second aspect of this invention, there is obtained the packet processing device mentioned in the first aspect, wherein the power supply switch unit supplies power to a packet existent one of the packet processors that has any packet, while supplying no power to a packet non-existent one of the packet processors that has no packet.

According to a third aspect of this invention, there is obtained the packet processing device mentioned in the first aspect, wherein the power supply switch unit supplies power to a packet existent one of the packet processors that has any packet and to at least one packet non-existent one of the packet processors that is preceded by M (M is an integer of one or more smaller than N) relative to the packet existent one of the packet processors, while the power supply switch unit supplies no power to the other packet processors.

According to a fourth aspect of this invention, there is obtained the packet processing device mentioned in the third aspect, wherein the power supply switch unit supplies power to a packet existent one of the packet processors that has any packet and to a packet non-existent one of the packet processors placed immediately before the packet existent one of the packet processors, while the power supply switch unit supplies no power to any other packet processors.

According to a fifth aspect of this invention, there is obtained the packet processing device mentioned in the fourth aspect, further comprising a packet buffer which is provided in a stage located immediately before a first one of stages of the packet processors and which buffers a packet and a buffer packet detector which detects whether or not a packet exists in the packet buffer, wherein the power supply switch unit supplies power to the first one of the stages of the packet processors when the buffer packet detector detects existence of any packet in the packet buffer.

According to a sixth aspect of this invention, there is obtained the packet processing device mentioned in the fifth aspect, wherein the buffer packet detector monitors the number of packets input to and the number of packets output from the packet buffer, and when the number of input packets matches the number of output packets, the buffer packet detector outputs, to the power supply switch unit, a detection signal indicative of on existence of any packet in the packet buffer.

According to a seventh aspect of this invention, there is obtained the packet processing device mentioned in the first aspect, wherein the processor packet detector monitors, for each of the packet processors, the number of input packets and the number of output packets, and outputs, to the power supply switch unit, a detection signal which is indicative of no existence of any packet in each of the packet processors in which the number of input packets matches the number of output packets.

According to an eighth aspect of this invention, there is obtained the packet processing device mentioned in the first aspect, wherein the power supply switch unit comprises power supply switch circuits, N in number, and a power supply unit, the power supply switch circuits being in one-to-one correspondence with the respective packet processors so as to switch on and off the power supply to the corresponding packet processors.

According to a ninth aspect of this invention, there is obtained the packet processing device mentioned in the first aspect, wherein the packet processors have a function of routing or switching an IP packet as the packet.

According to a tenth aspect of this invention, there is obtained the packet processing device mentioned in the first aspect, wherein the packet processing device is formed of a single LSI.

According to an eleventh aspect of this invention, there is obtained the packet processing device mentioned in the first aspect, wherein the packet processing device is formed of a single LSI comprising a packet input terminal for inputting each packet to the packet processing device and a packet output terminal for outputting the packet from the packet processing device.

According to a twelfth aspect of this invention, there is obtained packet communication equipment comprising a packet processing device mentioned in the first aspect.

According to a thirteenth aspect of this invention, there is obtained the packet communication equipment mentioned in the twelfth aspect, wherein a packet is received through wired connection.

According to a fourteenth aspect of this invention, there is obtained a power-saving device to be provided in a packet processing system having packet processors, N in number (N is an integer of one or more), which sequentially perform processing in response to an input packet to output a processed packet, the power-saving device comprising processor packet detectors which detect whether or not a packet exists in the respective packet processors and a power supply switch unit which switches on and off the power supply to the packet processors according to a result of detection of the processor packet detectors.

According to a fifteenth aspect of this invention, there is obtained the power-saving device mentioned in the fourteenth aspect, wherein the power supply switch unit supplies power to a packet existent one of the packet processors that has any packet, while supplying no power to a packet non-existent one of the packet processors that has no packet.

According to a sixteenth aspect of this invention, there is obtained the power-saving device according to the fourteenth aspect, wherein the power supply switch unit supplies power to a packet existent one of the packet processors that has any packet and to at least one packet non-existent one of the packet processors that is preceded by M (M is an integer of one or more smaller than N) relative to the packet existent one of the packet processors, while supplying no power to any other packet processors.

According to a seventeenth aspect of this invention, there is obtained the power-saving device according to the sixteenth aspect, wherein the power supply switch unit supplies power to a packet existent one of the packet processors that has any packet and to a packet non-existent one of the packet processors placed immediately before the packet existent one of the packet processors, while supplying no power to the other packet processors.

According to a eighteenth aspect of this invention, there is obtained the power-saving device according to the seventeenth aspect, wherein the packet processing device comprises a packet buffer which is provided in a stage placed immediately before a first one of stages of the packet processors and which buffers a packet; the power-saving device further comprises a buffer packet detector which detects whether or not a packet exists in the packet buffer; and the power supply switch unit supplies power to the first one of the stages of the packet processors when the buffer packet detector detects a packet in the packet buffer.

According to a nineteenth aspect of this invention, there is obtained the power-saving device according to the eighteenth aspect, wherein the buffer packet detector monitors the number of packets input to and the number of packets output from the packet buffer, and when the number of input packets matches the number of output packets, the buffer packet detector outputs, to the power supply switch unit, a detection signal indicative of no existence of any packet in the packet buffer.

According to a twentieth aspect of this invention, there is obtained the power-saving device according to claim 14, wherein the processor packet detector monitors, for each of the packet processors, the number of input packets and the number of output packet, and outputs, to the power supply switch unit, a detection signal indicative of no existence of any packet in each packet processor in which the number of input packets matches the number of output packets.

According to a twenty first aspect of this invention, there is obtained the power-saving device according to the fourteenth aspect, wherein the power supply switch unit comprises power supply switch circuits, N in number, and a power supply unit, the power supply switch circuits being in one-to-one correspondence with the packet processors to switch on and off the power supply to the corresponding packet processors.

According to a twenty second aspect of this invention, there is obtained a power supply method for supplying power to packet processors, N in number (N is an integer of one or more) which sequentially process an input packet to output a processed packet, the method comprising detecting whether or not a packet exists in the packet processors and switching on and off the power supply to the packet processors in accordance with a detection result in the above-mentioned detecting.

According to a twenty third aspect of this invention, there is obtained the power supply method according to the twenty second aspect, wherein the switching is performed so as to supply power to a packet existent one of the packet processors that has any packet and to supply no power to a packet non-existent one of the packet processors that has no packet.

According to a twenty fourth aspect of this invention, there is obtained the power supply method according to the twenty second aspect, wherein the switching is performed so as to supply power to a packet existent one of the packet processors that has any packet and to at least one packet non-existent one of the packet processors preceded by M (M is an integer of one or more) relative to the packet existent one of the packet processors and to supply no power to any other packet processors.

According to a twenty fifth aspect of this invention, there is obtained the power supply method according to the twenty fourth aspect, wherein the switching is performed so as to supply power to a packet existent one of the packet processors that has any packet, to supply power to a packet non-existent one of the packet processors placed immediately before the packet existent one of the packet processors, and to supply no power to any other packet processors.

What is claimed is:

1. A power supply method for supplying power to packet processors, N in number (N is an integer) which sequentially process an input packet to output a processed packet, the method comprising:
    detecting whether or not a packet is present in the packet processors;
    switching on and off the power supply to the packet processors in accordance with a detection result in the above-mentioned detecting;
    monitoring a number of input packets and a number of output packets in each packet processor; and
    detecting no presence of any packet when the number of the input packets matches the number of the output packets in said each packet processor.

2. The power supply method according to claim 1, wherein the switching is performed so as to supply power to a packet existent one of the packet processors that has any packet and to supply no power to a packet non-existent one of the packet processors that has no packet.

3. The power supply method according to claim 1, wherein the switching is performed so as to supply power to a packet existent one of the packet processors that has any packet and to at least one packet non-existent one of the packet processors preceded by M (M is an integer of one or more) relative to the packet existent one of the packet processors and to supply no power to any other packet processors.

4. The power supply method according to claim 3, wherein the switching is performed so as to supply power to a packet existent one of the packet processors that has any packet, to supply power to a packet non-existent one of the packet processors placed immediately before the packet existent one of the packet processors, and to supply no power to any other packet processors.

5. A packet processing device comprising:
    packet processors, N in number (N is an integer), which sequentially perform processing in response to an input packet to output a processed packet;
    a power supply unit which performs power supply;
    a power supply switch unit which switches on and off the power supply from the power supply unit to the packet processors; and
    processor packet detectors which detect whether or not a packet exists is present in the respective packet processors;
    wherein:
    each processor packet detector monitors a number of packets input to said each packet processor and a number of packets output from said each packet processor so as to detect whether or not a packet is present in said each packet processor;
    the power supply switch unit comprises:
    a power supply control unit coupled to the respective processor packet detectors and which generates gate control signals; and
    power supply switch circuits, N in number, which are in one-to-one correspondence with the respective packet processors and which respond to the gate control signals sent from the power supply control unit to switch on and off the power supply from the power supply unit to the respective packet processors.

6. The packet processing device claimed in claim 5, wherein the power supply control unit supplies the gate control signals to the power supply switch circuits to supply power to a packet existent one of the packet processors that has any packet, while supplying no power to a packet non-existent one of the packet processors that has no packet.

7. The packet processing device claimed in claim 5, wherein the power supply control unit supplies the gate control signals to the power supply switch circuits to supply power to a packet existent one of the packet processors that has any packet and to at least one packet non-existent one of the packet processors that is preceded by M (M is an integer of one or more smaller than N) relative to the packet existent one of the packet processors, while the power supply switch unit supplies no power to the other packet processors.

8. The packet processing device claimed in claim 7, wherein the power supply control unit supplies the gate control signals to the power supply switch circuits to supply power to a packet existent one of the packet processors that has any packet and to a packet non-existent one of the packet processors placed immediately before the packet existent one of the packet processors, while the power supply switch unit supplies no power to any other packet processors.

9. The packet processing device claimed in claim 8, further comprising:
a packet buffer which is provided in a stage located immediately before a first one of stages of the packet processors and which buffers a packet; and
a buffer packet detector which detects whether or not a packet exists is present in the packet buffer,
wherein the power supply control unit supplies the gate control signals to the power supply switch circuits to supply power to the first one of the stages of the packet processors when the buffer packet detector detects presence of any packet in the packet buffer.

10. The packet processing device claimed in claim 9, wherein the buffer packet detector monitors the number of packets input to and the number of packets output from the packet buffer, and when the number of input packets matches the number of output packets, the buffer packet detector outputs, to the power supply control unit, a detection signal indicative of on presence of any packet in the packet buffer.

11. The packet processing device claimed in claim 5, wherein the processor packet detector monitors, for each of the packet processors, the number of input packets and the number of output packets, and outputs, to the power supply switch unit, a detection signal which is indicative of no presence of any packet in each of the packet processors in which the number of input packets matches the number of output packets.

12. The packet processing device claimed in claim 5, wherein the packet processors have a function of routing or switching an IP packet as the packet.

13. The packet processing device claimed in claim 5, wherein the packet processing device is formed of a single LSI.

14. A power-saving device to be provided in a packet processing system having packet processors, N in number (N is an integer), which sequentially perform processing in response to an input packet to output a processed packet, the power-saving device comprising:
a power supply unit which performs power supply, and a power supply switch unit which switches on and off the power supply from the power supply unit to the packet processors; and
processor packet detectors which detect whether or not a packet is present in the respective packet processors;
wherein:
each processor packet detector monitors a number of packets input to said each packet processor and a number of packets output from said each packet processor so as to detect whether or not a packet is present in said each packet processor;
the power supply switch unit comprises:
a power supply control unit coupled to the respective processor packet detectors and which generates gate control signals; and
power supply switch circuits, N in number, which are in one-to-one correspondence with the respective packet processors and which respond to the gate control signals sent from the power supply control unit to switch on and off the power supply from the power supply unit to the respective packet processors.

15. The power-saving device according to claim 14, wherein the power supply control unit supplies the gate control signals to the power supply switch circuits to supply power to a packet existent one of the packet processors that has any packet, while supplying no power to a packet non-existent one of the packet processors that has no packet.

16. The power-saving device according to claim 14, wherein the power supply control unit supplies the gate control signals to the power supply switch circuits to supply power to a packet existent one of the packet processors that has any packet and to at least one packet non-existent one of the packet processors that is preceded by M (M is an integer of one or more smaller than N) relative to the packet existent one of the packet processors, while supplying no power to any other packet processors.

17. The power-saving device according to claim 16, wherein the power supply control unit supplies the gate control signals to the power supply switch circuits to supply power to a packet existent one of the packet processors that has any packet and to a packet non-existent one of the packet processors placed immediately before the packet existent one of the packet processors, while supplying no power to the other packet processors.

18. The power-saving device according to claim 17, wherein:
the packet processing device comprises a packet buffer which is provided in a stage placed immediately before a first one of stages of the packet processors and which buffers a packet;
the power-saving device further comprises a buffer packet detector which detects whether or not a packet is present in the packet buffer; and
the power supply control unit supplies the gate control signals to the power supply switch circuits to supply power to the first one of the stages of the packet processors when the buffer packet detector detects a packet in the packet buffer.

19. The power-saving device according to claim 18, wherein the buffer packet detector monitors the number of packets input to and the number of packets output from the packet buffer, and when the number of input packets matches the number of output packets, the buffer packet detector outputs, to the power supply switch unit, a detection signal indicative of no presence of any packet in the packet buffer.

20. The power-saving device according to claim 14, wherein the processor packet detector monitors, for each of the packet processors, the number of input packets and the number of output packet, and outputs, to the power supply switch unit, a detection signal indicative of no presence of any packet in each packet processor in which the number of input packets matches the number of output packets.

* * * * *